(12) United States Patent
Betancourt et al.

(10) Patent No.: US 6,382,271 B1
(45) Date of Patent: May 7, 2002

(54) APPARATUS AND METHOD FOR FLUID REPLACEMENT

(75) Inventors: Eduardo Betancourt, Long Beach; John Rome, Huntington Beach, both of CA (US)

(73) Assignee: Motorvac Technologies, Inc., Santa Ana, CA (US)

(*) Notice: Subject to any disclaimer, the term of this patent is extended or adjusted under 35 U.S.C. 154(b) by 0 days.

(21) Appl. No.: 09/704,044

(22) Filed: Nov. 1, 2000

Related U.S. Application Data

(63) Continuation-in-part of application No. 09/498,820, filed on Feb. 4, 2000, now Pat. No. 6,247,509, which is a continuation of application No. 09/184,621, filed on Nov. 2, 1998, now Pat. No. 6,062,275.

(51) Int. Cl.[7] .................................................. B65B 1/04
(52) U.S. Cl. .......................... 141/98; 141/192; 141/65; 184/1.5
(58) Field of Search .............................. 141/21, 65–67, 141/83, 94, 95, 192, 198, 98, 4, 5, 7, 59, 378, 367, 46; 184/1.5, 105.1

(56) References Cited

U.S. PATENT DOCUMENTS 4,938,315 A * 7/1990 Ohta et al.
5,273,085 A * 12/1993 Edwards et al.
5,626,170 A * 5/1997 Parker

* cited by examiner

Primary Examiner—Steven O. Douglas
(74) Attorney, Agent, or Firm—Farjami & Farjami LLP

(57) ABSTRACT

Apparatus and method of replacing old fluid in a transmission system by feeding clean fluid into the system from a clean fluid tank using a pump and draining the old fluid into a waste tank and using a processor to monitor the clean fluid pressure in the clean tank and the old fluid pressure in the waste tank and adjusting the pump's speed using the processor such that the old fluid is drained at substantially the same rate as the clean fluid is fed.

57 Claims, 7 Drawing Sheets

APPARATUS AND METHOD FOR FLUID REPLACEMENT

RELATED APPLICATIONS

The present application is a Continuation-In-Part of U.S. application Ser. No. 09/498,820, filed Feb. 4, 2000, now U.S. Pat. No. 6,247,509, which is a Continuation application of U.S. application Ser. No. 09/184,621, filed Nov. 2, 1998, now U.S. Pat. No. 6,062,275. All above-mentioned applications are hereby fully incorporated by reference in the present application.

BACKGROUND OF THE INVENTION

1. Field of the Invention

The present invention relates generally to vehicular maintenance and, more particularly, to systems and methods for replacing transmission fluid.

2. Related Art

For the past several years, substantial attention has been directed to the field of transmission fluid changers. Such systems are useful, for example, in draining the oil from a vehicle transmission system in order to replace the transmission filter and/or to completely replace the old transmission fluid with new fluid. Existing transmission fluid changers such as those described in U.S. Pat. No. 5,447,184, U.S. Pat. No. 5,472,064, U.S. Pat. No 5,318,080 and U.S. Pat. No. 5,370,160 require substantial human intervention during the fluid exchange process.

However, there is an intense need within the industry to provide a more efficient, less time consuming and a more user-friendly system for transmission fluid replacement that substantially reduces human intervention.

In view of this necessity, it is believed that those skilled in the art would find automated systems and methods for draining, filling and changing of transmission fluid to be quite useful.

SUMMARY OF THE INVENTION

In a first separate aspect, the present invention is directed to an apparatus for replacing waste fluid with clean fluid. The apparatus includes a waste tank for receiving the waste fluid from a first port, a clean tank containing the clean fluid, a processor coupled to first and second sensors, and a pump coupled to the processor for pumping the clean fluid into a second port. The processor measures the waste fluid level via the first sensor and measures the clean fluid level via the second sensor. Based on these measurements, the processor controls the pump's speed.

In a second separate aspect, the apparatus of the first separate aspect may also include a solenoid switch that includes first and second ports and a plurality of paths for transferring the clean and waste fluids.

In a third separate aspect of the invention, the paths in the solenoid switch of the second separate aspect may be selected via the processor by measuring the fluid pressure at each solenoid switch port.

In a fourth separate aspect, the apparatus of the first separate aspect may also include a disposal pump coupled to the processor for pumping the waste fluid from the waste tank into a disposal tank.

In a fifth separate aspect, the present invention is directed to a method of replacing waste fluid with clean fluid. The method comprises the step of providing a waste tank for receiving the waste fluid from a first port and a clean tank containing the clean fluid. The method further includes the step of coupling a processor to a first sensor, a second sensor and a pump for pumping the clean fluid into a second port. The method also includes the steps of measuring the waste fluid via the first sensor using the processor and measuring the clean fluid via the second sensor using the processor. And the method includes the step of controlling the pump using the processor based on the measuring steps.

In a sixth separate aspect, the present invention is directed to a method of replacing waste fluid in a system with clean fluid. The method includes the steps of draining a portion of the waste fluid from the system into a waste tank, measuring the amount of the drained fluid with a processor, and replacing the drained fluid with clean fluid from a clean tank using a pump that is controlled by the processor.

In a seventh separate aspect, the method of the sixth separate aspect may include the steps of withdrawing the remaining portion of the waste fluid plus the clean fluid in the system into the waste tank, gauging the amount of the withdrawn fluid using the processor, feeding the system with the clean fluid using the pump, gauging the amount of fluid in the feeding step using the processor, and controlling the pump such that the withdrawing step proceeds at substantially the same rate as the feeding step.

In an eighth separate aspect, the method of the seventh separate aspect may include the step of terminating the process when the clean fluid reaches a low level in the clean tank.

In a ninth separate aspect, the method of the seventh separate aspect may include the step of pumping an extra amount of the clean fluid into the system.

In a tenth separate aspect, the present invention is directed to a method of replacing a first fluid in a system having a pan with a second fluid. The method comprises the step of draining a substantial portion of the first fluid in the pan and then removing the pan to service the system, such as replacing a filter in the system. The method further comprises the steps of reconnecting the pan and replacing the drained first fluid with a substantially equal amount of the second fluid. The method also includes the step of draining the remaining amount of first fluid in the system contemporaneously with receiving the second fluid.

In an eleventh separate aspect, the present invention is directed to an apparatus for replacing a first fluid in a system with a second fluid. The apparatus comprises a pump for pumping the second fluid into the system. The apparatus also includes a first control board which receives power from a power supply and controls power to the pump. The apparatus further includes a second control board which receives power from the first control board and controls flow of the first fluid and the second fluid.

Accordingly, it is an object of the present invention to provide apparatus and method of replacing one fluid with another in a system, such as a vehicle transmission system.

Other objects and features of the present invention will become apparent from consideration of the following description taken in conjunction with the accompanying drawings.

DETAILED DESCRIPTION OF THE INVENTION

Figure 1:
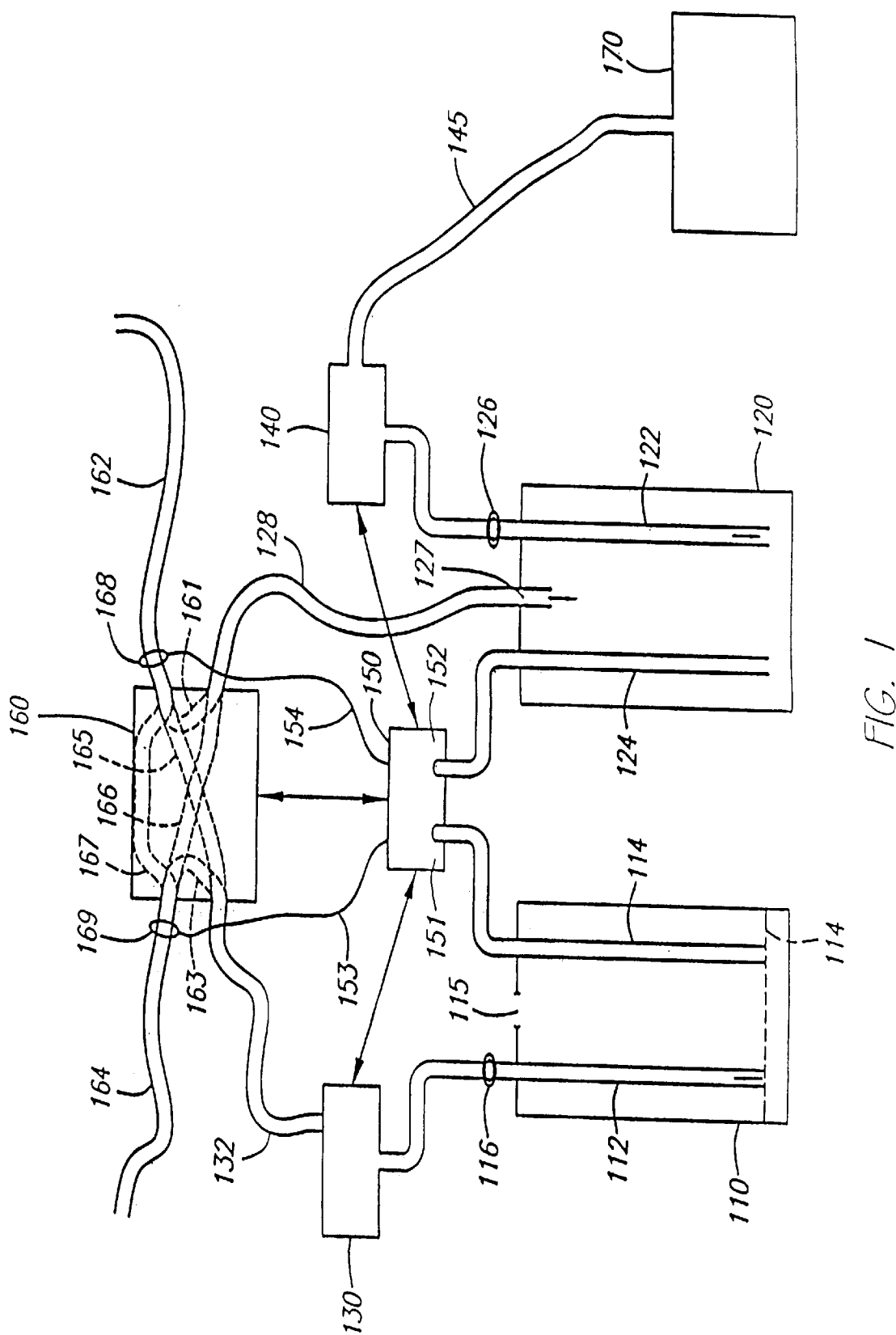
FIG. 1 is a schematic diagram of an automated system for replacing transmission fluid.

Turning now to the drawings, FIG. 1 provides a schematic illustration of a fluid changer system 100 according to a preferred embodiment of the present invention. As shown, the system 100 includes a clean fluid tank 110, a waste fluid tank 120, a clean pump 130, a waste pump 140, a solenoid switch 160, a disposal tank 170 and a printed circuit board (PCB) 150 with an on-board microprocessor (not shown), a clean tank pressure sensor 151 and a waste tank pressure sensor 152.

The clean tank 110 contains fresh fluid that is supplied to a vehicle transmission system (not shown). The clean tank 110 also includes a clean tank tube 112 with one end inside the clean tank 110 and the other end extending out and being connected to a clean fluid pump 130. As shown, the clean tank tube 112 includes a filter 116 for purifying the fresh fluid before reaching the clean pump 130.

The clean pump 130 pumps the fresh fluid out of the clean tank 110 through the clean tank tube 112 and filter 116 into the clean pump outlet tube 132. The clean pump outlet tube 132 transports the fresh and purified fluid to the solenoid switch 160, the operation of which is discussed below.

Turning back to the clean tank 110, the clean tank 110 further includes a port 115 for withdrawing fluid from or adding fluid to the clean tank 110. The clean tank 110 also includes a clean sensor tube 114 that extends out of the tank 110 and is coupled to the PCB 150, so the on-board microprocessor can measure the fresh fluid pressure in the clean tank 110.

As illustrated, the PCB 150 also receives a waste sensor tube 124 from the waste tank 120 for the purpose of measuring the waste fluid pressure in the waste tank 120. The waste tank 120 also includes a waste tank tube 122 which extends out of the waste tank 120 and a waste filter 126 to reach a waste pump 140 for pumping out the waste fluid. The waste fluid is passed through the filter 126 so to prevent the impurities of the waste fluid from interfering with the proper operation of the waste pump 140.

As seen in FIG. 1, the waste pump 140 pumps the waste fluid out via the waste tube 122 and pumps the waste fluid into the disposal tank 170 via a disposal tube 145.

Referring back to the waste tank 120, the waste tank 120 receives the waste fluid through a waste inlet port 127 connected via a waste inlet tube 128 to the solenoid switch 160.

Figure 1A:
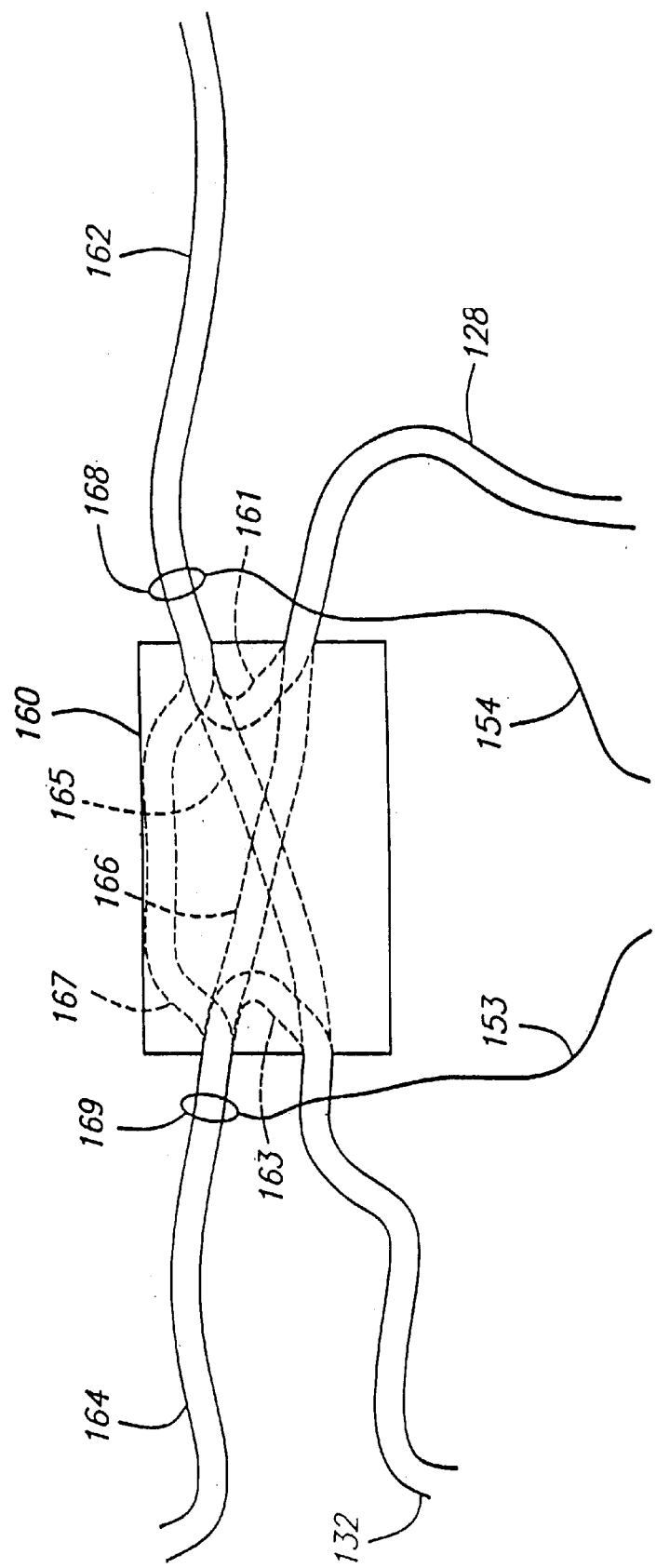
FIG. 1A is an exploded view of a solenoid switch of the system of FIG. 1.

In a preferred embodiment, the solenoid system 160 comprises three solenoid valves (not shown) that are controlled via the PCB 150 microprocessor in accordance with the modes of operation described below. The three solenoid valves are set or reset according to each mode of operation to create the desirable fluid paths, such as fluid paths 161, 163, 165, 166 and 167, as shown in FIG. 1A.

In addition to the clean pump outlet tube 132 and the waste inlet tube 128, the solenoid switch 160 is also connected to a first hose 162 and a second hose 164 for receiving the waste fluid from the vehicle and replacing the waste fluid with fresh fluid from the clean tank 110. Connected to the first hose 162 is a first hose pressure sensor 168 that is electrically connected to the PCB 150 via the first sensor wire 154. Similarly, connected to the second hose 164 is a second hose pressure sensor 169 that is electrically connected to the PCB 150 via the second sensor wire 153.

Figure 4:
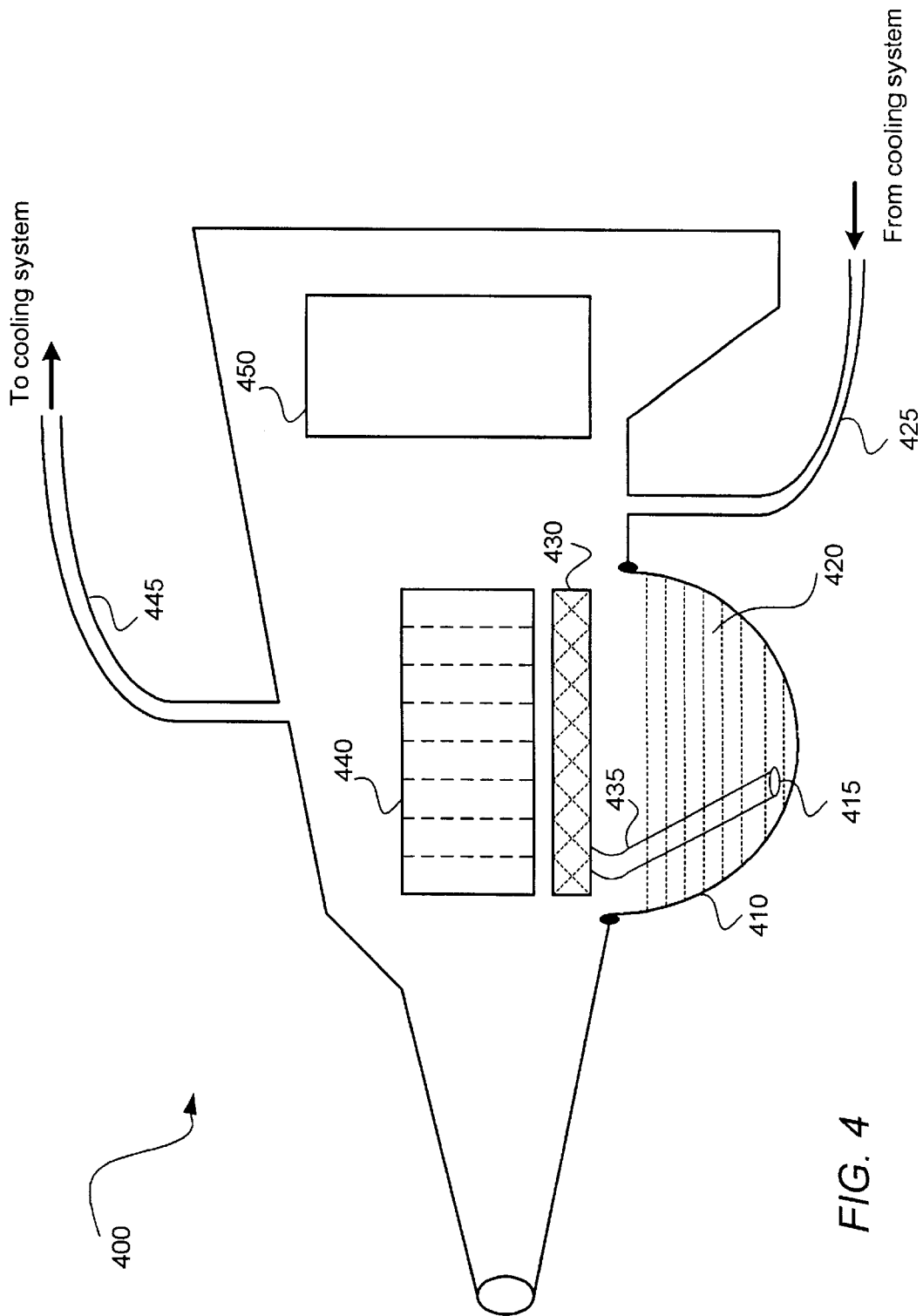
FIG. 4 is a conventional transmission system for service by the system of FIG. 1.

FIG. 4 illustrates a conventional transmission system 400 that may be serviced using various embodiments and methods of the present invention. It should be noted that the present invention may be used in conjunction with various systems, such as hydraulic systems and the like, and is not limited to servicing transmission systems. As shown, transmission system 400 includes valve body 430, clutch chamber 440 and torque converter 450. Transmission 400 also includes pan 410 that contains transmission fluid 420. The size of pan 410 may vary from one transmission system to another. Transmission fluid 420 is picked up by fluid hose 435 from fluid pick-up 415 in pan 410. Transmission fluid 420 is circulated through various parts of transmission system 400, such as valve body 430, clutch chamber 440 and torque converter 450. Transmission fluid 420 is removed from transmission system 400 through remove line 445 to one end of the cooler line (not shown) and returns to transmission system 400 through return line 425 from the other end of the cooler line.

In a preferred embodiment, the cooler line (not shown) of the vehicle is disconnected and reconnected at one end through the first hose 162 and at the other end through the second hose 164. For example, when the recirculating path 167 is established within the solenoid system 160, the transmission fluid may flow from one end of the cooler line through the first hose 162 through the recirculating path 167 and the second hose 164 to reach the other end of the cooler line. While the vehicle engine is operating, the vehicle transmission pump (not shown) pumps the transmission fluid through the cooler line. The transmission fluid, depending upon the fluid flow direction, enters either from the first hose 162 or the second hose 164. Regardless of the fluid direction, however, the vehicle's transmission fluid circulates through the path 167 and back to the vehicle system.

To utilize the system 100 for replacing the waste fluid, the vehicle cooler line is disconnected while the vehicle's engine is off. The cooler line is connected to the first hose 162 at one end and the second hose 164 at the other end. At this point, the system 100 is powered on. The default setting for the solenoid system is the recirculating path 167. Accordingly, when the vehicle engine starts, the transmission fluid is pumped through the solenoid system 160.

Figure 2:
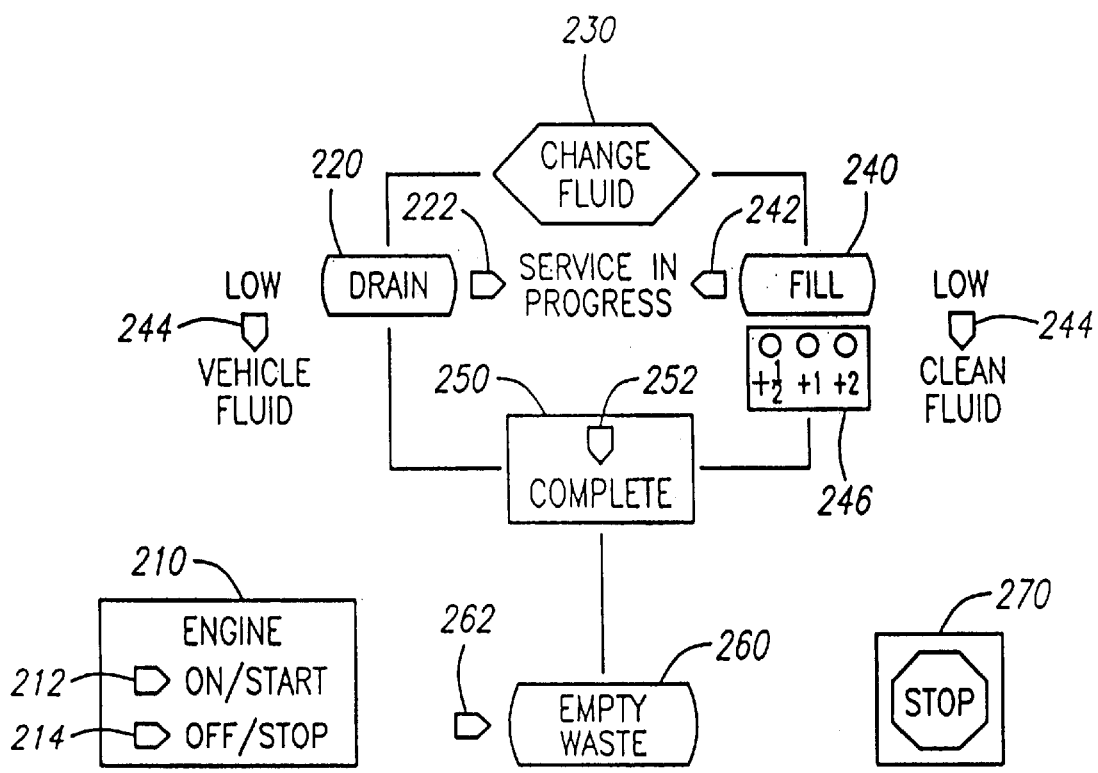
FIG. 2 is a pictorial view of a control panel of the system of FIG. 1.

Now, referring to FIG. 2, a computer control panel 200 of a preferred embodiment is shown. In a preferred method of replacing the waste fluid, the process may begin by pressing the drain button 220. The drain pan function drains the waste fluid from the vehicle so the vehicle transmission pan 410 (see FIG. 4) can be dropped in order to change the transmission filter (not shown).

By pressing the drain button 220, the on-broad microprocessor begins the process by turning on the drain LED 222 to indicate that the drain process has begun. If the vehicle's engine is off, the on/start LED 212 blinks to indicate that the engine must be turned on so the vehicle's transmission pump starts pumping the waste fluid through the solenoid system 160. Once the engine is turned on, the on/start LED 212 stops blinking and stays on continuously.

At this point, the on-board microprocessor determines the transmission fluid direction in the first and second hoses 162 and 164 in order to set up the solenoid valves and select the proper path inside the solenoid system 160. This task is accomplished by sensing the fluid flow in the first and second hoses 162 and 164 via their respective pressure sensors 168 and 169. According to the sensed pressures, the microprocessor determines the waste fluid circulation direction in the cooler line. Also, based upon the pressures sensed from the pressure sensor tubes 114 and 124, the microprocessor determines the amount of fluid in each tank. The waste tank 120 being substantially empty has a lower fluid pressure than the clean fluid tank 110 containing fresh fluid to be pumped in.

Having determined the fluid flow direction and the location of the tanks 110 and 120, the solenoid valves are set such that the proper path is taken. For example, if the fluid enters the solenoid system 160 through the first hose 162, the path 161 is set up such the waste fluid is directed into to the waste tank 120 through the waste inlet tube 128 through the waste inlet port 127. On the other hand, if the fluid flow direction is from the second hose 164, the solenoid switch is set up such that the path 166 is selected.

Before directing the waste fluid to the waste tank 120, using the pressure sensor 152 the present fluid level of the waste tank 120 is captured by the microprocessor for future determination of the amount of drained waste fluid. In a preferred embodiment, the fluid pressure in the waste tank 120 is checked every seven seconds to determine whether the waste fluid is flowing and whether the waste tank 120 is being filled. If the waste tank 120 is not being filled, the drain LED 222 goes off, the solenoid switch valves are set to assume the recirculate path 167, the engine off/stop LED 214 turns on, the engine on/start LED 212 flashes, and the sounder sounds until the stop button 270 is pressed.

However, if these error conditions do not occur, the transmission fluid is sufficiently drained so the vehicle's transmission pan 410 (see FIG. 4) can be dropped. The solenoid valves are set such that no more fluid flows from the first and second hoses 162 and 164, and the low vehicle fluid LED 224 is turned to indicate that the drain process is complete.

At this step, the vehicle transmission pan may be dropped and the transmission filter may be changed without transmission fluid flowing from the transmission system. After the filter has been replaced and the drain pan 410 (see FIG. 4) is placed in its original position, the drained waste fluid may be replaced by pressing the fill button 240 on the control panel 200.

At the fill step, the PCB 150 determines the volume of the drained waste fluid based on the captured fluid level in the waste tank 120 at the start of the drain process and the current fluid level in the waste tank 120. Those of ordinary skill recognize that the fluid level may be calculated based on the sensed pressure via the pressure sensor 152. Knowing the drained volume, the PCB 150 activates the clean fluid pump 130 to pump an equal volume of fresh liquid from the clean fluid tank 110 to the transmission system. In other words, enough clean fluid is pumped out such that pressure sensors 151 and 152 reach the same pressure balance as before the drain process started.

The PCB 150 also sets up the solenoid valves such that the fluid carried via the clean pump outlet tube 132 is routed correctly. If the first hose 162 was determined to be the in-hose-as determined at the beginning of the draining process-the solenoid system 160 is set up to select path 165 so the clean fluid reaches the first hose 162 and from there into the transmission. On the other hand, if the second hose 164 is the in-hose, the path 163 is taken so the clean fluid reaches the second hose 164.

When the fill button 240 is pressed, the fill indicator LED 242 goes on indicating that a fill process is in progress. If the fill button 240 is pressed only once, an amount equal to the drained fluid volume is pumped back into the transmission system. However, each additional time that the fill button 240 is pressed the system is instructed to pump an extra half a quart of fluid into the transmission system.

Accordingly, if the fill button 240 is pressed twice instead of once, the +½ LED in box 246 comes on indicating that an extra half a quart will be pumped into the transmission system. If the fill button 240 is pressed three times, the +1 LED in box 246 comes and one extra quart is pumped in. If the fill button is pressed eight times, the three LEDs +½, +1 and +2 in box 246 come on and 3.5 extra quarts of fluid will be pumped in. The fill indicator LED 242 goes off when the fill process is complete.

The next step of the process may begin by pressing the change fluid button 230 on the control panel 200. At this step, the system 100 pumps clean fluid into the vehicle at substantially the same rate as pumping waste fluid out of the transmission system. Before the change fluid button 230 is pressed the first and second hoses 162 and 164 must be connected to the cooler line of the vehicle. The solenoid system is in its default state, i.e., the recirculation path 167 is in effect.

Once the change fluid button 230 is pressed, the change fluid process starts. If the clean fluid level in the clean tank 110 is low, the low clean fluid LED 244 starts flashing and the sounder starts sounding until the stop button 270 is pressed. Also, if the waste tank 120 is over ¼ full, the empty waste LED 260 starts flashing and the sounder sounds until the stop button 270 is pressed. If the preliminary conditions are correct, the fluid levels in the clean tank 110 and the waste tank 120 are measured via the pressure sensors 151 and 152, respectively. In case the low clean fluid LED 244 is on, the clean fluid tank must be filled.

According to the flow direction-sensing process explained above, the system 100 determines the in-hose and the out-hose directions between the first and second hoses 162 and 164, and also determines the clean pump outlet tube 132 and the waste inlet tube 128 via pressure sensors 168, 169, 151 and 152, respectively. Once the flow direction is determined the solenoid valves in the solenoid system 160 are properly set to pump in the clean fluid and receive the waste fluid. For example, if the second hose 164 is the out-hose, path 163 is selected so that clean fluid flows from the clean fluid outlet tube 132 to the second hose 164 and into the transmission system. In this case, path 161 is also selected so the waste fluid being pumped by the vehicle engine flows from the first hose 162 through path 161 into the waste inlet tube 128 and the waste inlet port 127.

However, if the first hose 162 is the out-hose, path 165 is selected so the clean fluid flows from the clean fluid outlet tube 132 into the first hose 162 and into the transmission system. Naturally, path 166 is also selected so the waste fluid flows from the second hose 164 to the waste inlet tube 128 and into the waste tank 120.

Once the proper paths are selected, the clean fluid pump 130 pumps out clean fluid from the clean fluid tank 110 via the clean fluid tube 112 and through the clean fluid filter 116. From there, clean fluid is pumped through the clean pump outlet tube 132 into the solenoid switch 160 and into the transmission system through the pre-selected path. As for the waste fluid, the vehicle transmission pump (not shown) also pumps the transmission fluid as the engine is running. Waste fluid flows from either the first hose 162 or the second hose 164 and takes the pre-selected path to reach the waste inlet tube 128 and the waste tank 120.

In a preferred embodiment, every seven seconds during the change fluid process, the microprocessor on the PCB 150 monitors the flow rate based on pressure values obtained from the waste tank pressure sensor 152 and the clean tank pressure sensor 151. The change in pressure in the clean tank 110 is calculated by simply subtracting the current pressure from previous pressure. The change in pressure in the waste tank 120 is calculated by subtracting the previous pressure from the current pressure.

If the change in pressure in the waste tank 120 is higher than the change in pressure in the clean tank 110, it means that the waste tank 120 is being filled more quickly than the clean tank 110 is being emptied. In that case, the clean pump's 130 speed must be increased by a value proportionate to the difference in pressure changes in the clean tank 110 and the waste tank 120.

However, If the change in pressure in the clean tank 110 is higher than the change in pressure in the waste tank 120, it means that the waste tank 120 is being filled less rapidly than the clean tank 110 is being emptied. Accordingly, the clean pump's 130 speed must be reduced by a value proportionate to the difference in pressure changes in the clean tank 110 and the waste tank 120.

The automatic flow rate control and its timing are important features since pumping the clean fluid faster than the vehicle's transmission pump is pumping the waste fluid will cause a fluid overflow in the transmission system. On the other hand, slow pumping of the clean fluid would cause a fluid underflow in the transmission system which may damage the vehicle and would also require the vehicle's engine be stopped from time to time to allow the clean tank pump 130 to catch up with the vehicle's transmission pump's faster speed. Therefore, those of ordinary skill in the art would appreciate such properly timed flow control that substantially eliminates human intervention during the change fluid process.

If the clean tank 110 becomes empty during the fluid change process, the sounder starts sounding and the solenoid system 160 reverts back to its default recirculating path 167. In such event, more fluid may be added to the clean fluid tank 110 providing the waste tank level is below ¼ tank full and the change fluid button 230 may be pressed so the system 100 restarts the process from the last point. If LED 162 is lit, waste fluid must be emptied before proceeding.

In a preferred embodiment, once the fluid level in the clean fluid tank 110 reaches the low-level fine 111, the change process is complete and the complete LED 252 comes on to indicate the end of process. At the completion of the fluid change process, the solenoid system reverts to its default recirculating path 167 and the transmission fluid circulates through the solenoid switch.

At this point, the system 100 may be used to add extra fluid to the transmission system by pressing the fill button 240, as explained above.

At the final stage, the vehicle engine is stopped and the cooler line is disconnected from the first and second hoses 162 and 164 and reconnected in its original form. Pressing the empty waste button 260 on the control panel 200 may also empty the waste tank 120.

Once the empty waste button 260 is pressed, the empty waste LED 262 comes on indicating that the waste tank 120 is being emptied out into the disposal tank 170. The waste fluid is pumped out the waste tank 120 using the waste fluid pump 140 and via the waste fluid tube 122, through the waste fluid filter 126 and from there to the disposal tube 145 and the disposal tank 170. Once the waste tank 120 is emptied, the empty waste LED 262 turns off. The process may also be stopped at any time by pressing the stop button 270.

Figure 3:
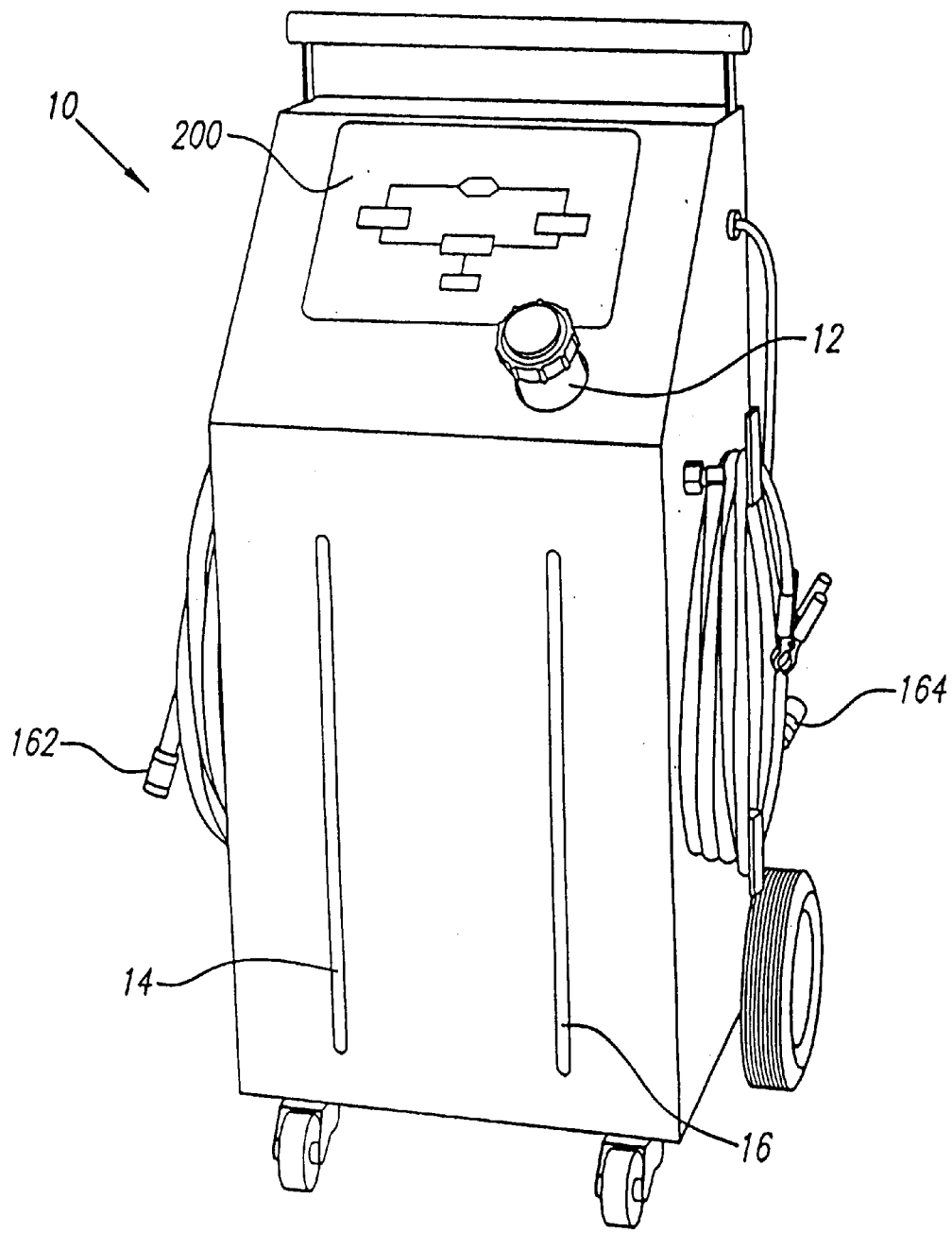
FIG. 3 is a pictorial view of the system of FIG. 1.

Turning to FIG. 3, a pictorial representation of a transmission service system 10 is shown. As shown, the service system 10 includes the fluid changer system 100 and the control panel 200. In addition, the service system includes a fluid port 12 corresponding to the clean tank port 115 for adding or draining fresh fluid. The service system 10 also includes a clean fluid level meter 16 and a waste fluid level meter 14 for visually determining the fluid level in the clean fluid tank 110 and the waste fluid tank 120, respectively.

Referring to FIG. 4, it should be noted that the above-described draining process has other advantages in addition to preventing transmission fluid 420 from flowing from transmission system 400 in case pan 410 is dropped or removed in order to replace the transmission filter or to service transmission system 400. For example, even if pan 410 is not dropped, draining pan 410 (see FIG. 4) removes a substantial portion of waste fluid and, as a result, prevents clean transmission fluid from being mixed with waste fluid or transmission fluid 410 during the change fluid process described above. After removing a substantial portion of waste fluid from transmission system 400 during the draining process, any waste fluid remaining in various elements of transmission system 400, such as valve body 430, clutch chamber 440 or torque converter 450, is forced out by the clean fluid that is pumped into transmission system 400 during the change fluid process. Accordingly, mixture of clean and waste fluids, during the change fluid process, is considerably avoided.

Figures 1, 5:
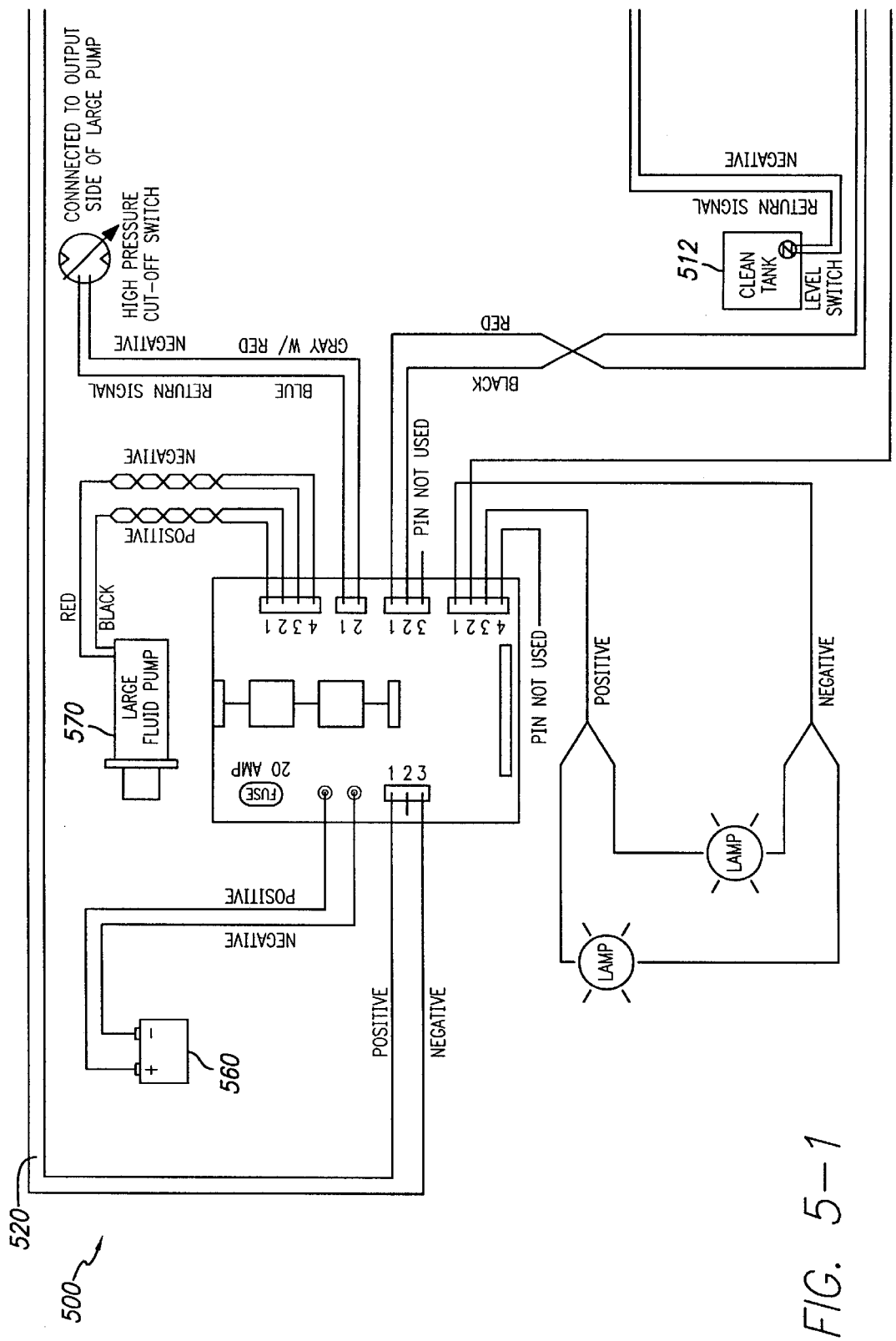
FIG. 5 is an electrical schematic diagram of the system of FIG. 1.
Figures 2, 5:
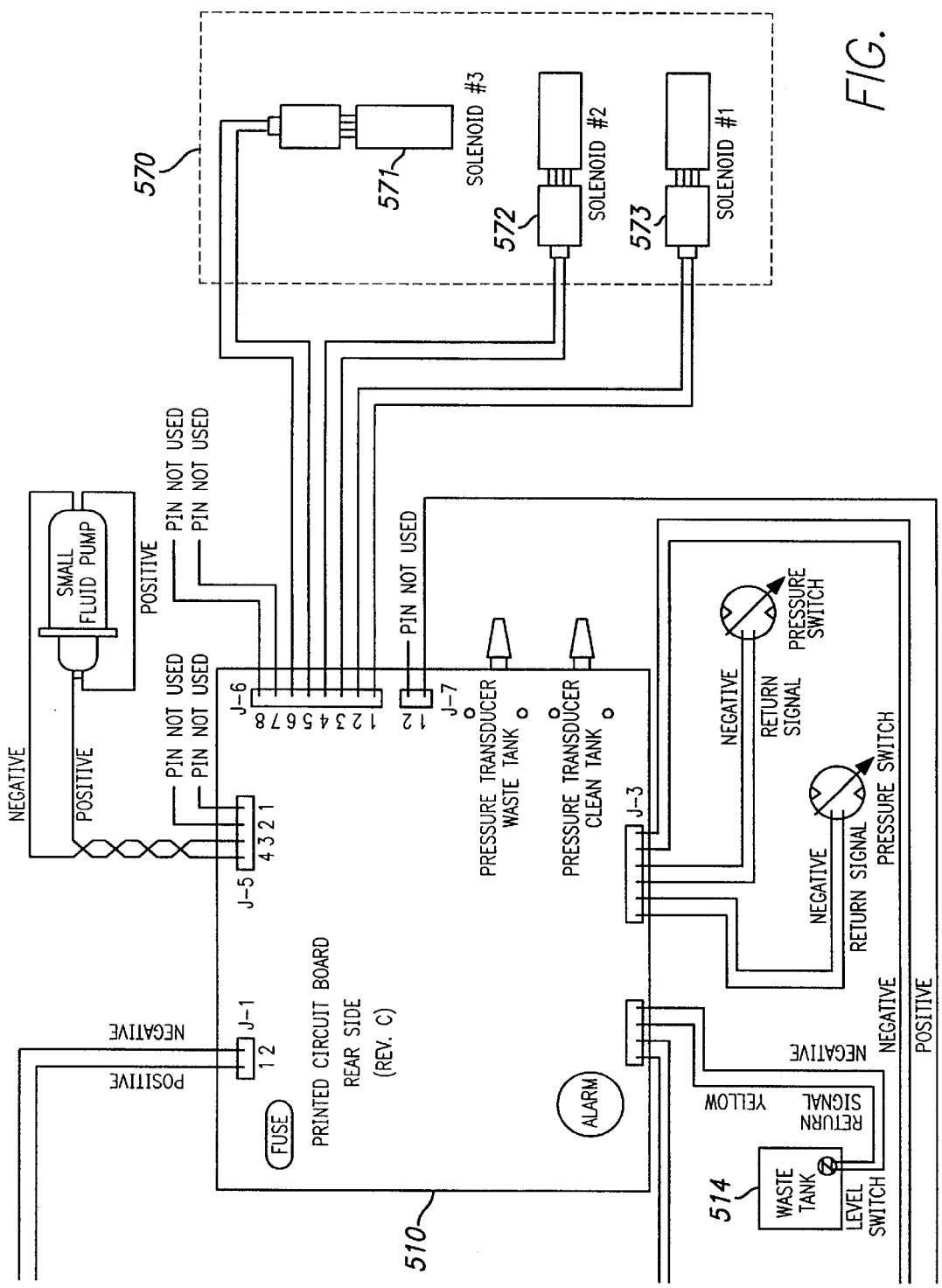

FIG. 5 illustrates an electrical schematic diagram of electrical system 500, according to one embodiment of the present invention. According to this embodiment, electrical system 500 includes main control PCB 510 and power control PCB 550. Main control PCB 510 primarily controls the flow of fluid and includes an on-board microprocessor (not shown). Main control PCB 510 further includes clean tank sensor and a waste tank sensor, as described in conjunction with FIG. 1, to measure amount of fluid in clean tank 512 and waste tank 514, respectively. Moreover, main control PCB 510 controls first hose sensor and second hose sensor, described in conjunction with FIG. 1 above. Those of ordinary skill recognize that various types of sensors or devices, in addition to level or pressure sensor, can be used to perform functions of sensors of the present invention.

Power control PCB 550 primarily controls the distribution of power in electrical system 500 and to main control PCB 510. Power control PCB 550 provides electrical power to main control board PCB 510 via power lines 520. As shown, power control PCB 550 is coupled to power supply 560. In one embodiment, power supply 560 may be a vehicle battery providing 12 or 24 volts of electricity. Power control PCB 550 also controls power distribution to fluid pump 570. In one embodiment, power control PCB 550 may provide more voltage to fluid pump 570 than main control PCB 510, for example, when fluid pump 570 must run at a higher rate. As a further example, if power supply 560 is a 24-volt battery, power control PCB 550 may vary electrical power to fluid pump 570 ranging from 0 volts (idle) to 24 volts (full speed), but provide a constant 12-volt power to main control PCB 510. As a result, in order to support various power supplies or voltages, main control PCB 510 need not be redesigned or modified, instead, only power control PCB 550 may be affected.

Those skilled in the art will appreciate that, while the system 100 provides for processes such as draining, filling, changing fluid and emptying waste fluid, it would be possible in accordance with the present invention to design a system that allows for only one or more of the above-described processes.

While the present invention is susceptible to various modifications and alternative forms, specific examples thereof have been shown in the drawings and are herein described in detail. It should be understood, however, that the invention is not to be limited to the particular forms or methods disclosed, but to the contrary, the invention is to cover all modifications, equivalents, and alternatives falling within the spirit and scope of the appended claims.

What is claimed is:

1. A method of replacing a first fluid, in a system including a pan, with a second fluid, the method comprising the steps of:

draining a first portion of said first fluid;
   removing said pan;
   reconnecting said pan;
   replacing said first portion of said first fluid with a first portion of said second fluid; and
   draining a second portion of said first fluid contemporaneously with providing a second portion of said second fluid.

2. The method of claim 1, wherein said system further includes a filter, and the method further includes a step of replacing said filter prior to said step of reconnecting said pan.

3. The method of claim 1, wherein said step of draining said first portion of said first fluid substantially drains said first fluid in said pan.

4. The method of claim 1, wherein said second portion of said first fluid is drained at substantially the same rate as providing said second portion of said second fluid.

5. The method of claim 1 further comprising a step of measuring an amount of said first portion of said first fluid, wherein said first portion of second fluid is substantially equal to said amount.

6. An apparatus for replacing a first fluid in a system with a second fluid, said apparatus comprising:

a processor;
   a pump controlled by said processor; and
   wherein a first portion of said first fluid is drained from said system, said processor measures an amount of said first portion, said pump replaces said first portion of said first fluid with a first portion of said second fluid substantially equal to said amount, wherein a second portion of said first fluid is contemporaneously replaced with a second portion of said second fluid, and wherein said system includes a pan, and said pan is removed before said pump replaces said first portion of said first fluid with said first portion of said second fluid.

7. The apparatus of claim 6, wherein said pan is reconnected after said pan is removed.

8. The apparatus of claim 6, wherein said system further includes a filter, and said filter is replaced after said pan is removed.

9. The apparatus of claim 6, wherein said first fluid in said pan is substantially drained prior to removing said pan.

10. The apparatus of claim 6, wherein said second portion of said first fluid is drained at substantially the same rate as providing said second portion of said second fluid.

11. A method of replacing a first fluid in a system having a pan with a second fluid, the method comprising the steps of:

draining a substantial portion of said first fluid in said pan;
   removing said pan;
   replacing said portion of said first fluid with a first portion of said second fluid; and
   draining said first fluid remained in said system contemporaneously with providing a second portion of said second fluid.

12. The method of claim 11 further comprising a step of reconnecting said pan after said step of removing.

13. The method of claim 11, wherein said replacing step is performed after said draining steps.

14. A method of replacing a first fluid in a system having a pan with a second fluid, the method comprising the steps of:

draining a substantial portion of said first fluid in said pan;
   removing said pan; and
   draining said first fluid remained in said system contemporaneously with providing a second portion of said second fluid;
   wherein said first fluid is substantially equal in amount to said first and second portions of said second fluid combined.

15. An apparatus for replacing a first fluid in a system with a second fluid, said apparatus comprising:

a pump for pumping said second fluid into said system;
   a first control board receiving a first power from a power supply and providing a second power to said pump; and
   a second control board receiving a third power from said first control board and controlling flow of said first fluid and said second fluid.

16. The apparatus of claim 15, wherein said first power from said power supply is about 24 volts.

17. The apparatus of claim 16, wherein said first control board controls said first power such that said second power is about 24 volts and said third power is about 12 volts.

18. The apparatus of claim 16, wherein said first control board controls said first power such that said second power and said third power are about 12 volts.

19. The apparatus of claim 16, wherein said first control board controls said first power such that said second power is about 6 volts.

20. An apparatus for replacing a first fluid in a system with a second fluid, said apparatus comprising:

a processor coupled to a first sensor sensing said first fluid and a second sensor sensing said second fluid; and
   a pump coupled to said processor for pumping said second fluid into said system;
   wherein said processor performs a first measurement of said first fluid via said first sensor and performs a second measurement of said second fluid via said second sensor, and wherein said processor controls said pump based on said first and second measurements.

21. The apparatus of claim 20, wherein said first sensor is a level sensor.

22. The apparatus of claim 20, wherein said first sensor is a pressure sensor.

23. The apparatus of claim 20 further comprising a filter, wherein said second fluid passes through said filter prior to reaching said pump.

24. The apparatus of claim 20 further comprising a first filter, wherein said first fluid passes through said first filter.

25. The apparatus of claim 24 further comprising a second filter, wherein said second fluid passes through said filter prior to reaching said pump.

26. The apparatus of claim 20, wherein said pump pumps said second fluid from a source and said second measurement measures a second fluid level in said source, and wherein said first fluid enters a waste tank and said first measurement measures a first fluid level in said waste tank.

27. The apparatus of claim 20, wherein said processor controls a speed of said pump.

28. A method of replacing a first fluid in a system with a second fluid, said method comprising the steps of:
    withdrawing said first fluid;
    pumping said second fluid into said system during said withdrawing step;
    measuring said first fluid and said second fluid by a processor during said withdrawing and pumping steps; and
    controlling said pumping step by said processor based on said measuring step.

29. The method of claim 28, wherein said processor measures said first fluid and second fluid using level sensors.

30. The method of claim 28, wherein said processor measures said first fluid and second fluid using pressure sensors.

31. The method of claim 28 further comprising a step of filtering said second fluid prior to said step of pumping.

32. The method of claim 28 further comprising a step of recovering said first fluid from said system.

33. The method of claim 32 further comprising a step of filtering said first fluid after said step of recovering.

34. The method of claim 28, wherein said pumping step pumps said second fluid from a source and said withdrawing step deposits said first fluid into a waste tank, said measuring step further including the steps of:
    determining a second fluid level in said source;
    determining a first fluid level in said waste tank; and
    comparing said first and said second fluid levels.

35. The method of claim 28, wherein said controlling step controls a speed of said pump.

36. The method of replacing a first fluid in a system with a second fluid using a service apparatus having a service pump, a plurality of fluid paths, a first hose and a second hose, said system having a system pump, a system inlet and a system outlet, said method comprising the steps of:
    connecting said first hose to said system outlet;
    connecting said second hose to said system inlet;
    starting said system pump to pump said first fluid out of said system outlet;
    circulating said first fluid being pumped out by said system pump back into said system by selecting a recirculating path of said plurality of fluid paths to direct said first fluid from said system outlet and said first hose to said second hose and said system inlet;
    selecting a replacement path of said plurality of fluid paths to pump out said first fluid from said system through said system outlet and said first hose;
    starting said service pump to pump in a second fluid into said system through said second hose and said system inlet;
    stopping said service pump;
    circulating said second fluid being pumped out by said system pump back into said system by selecting said recirculating path of said plurality of fluid paths to direct said second fluid from sad system outlet and said first hose to said second hose and said system inlet; and
    stopping said system pump.

37. The method of claim 36, wherein said service apparatus further includes a processor, and wherein after said step of starting said service pump, said method further comprising the steps:
    measuring said first fluid and said second fluid by said processor; and
    controlling said service pump by said processor based on said measuring step.

38. The method of claim 37, wherein said processor measures said first fluid and second fluid using level sensors.

39. The method of claim 37, wherein said processor measures said first fluid and second fluid using pressure sensors.

40. The method of claim 37, wherein said service pump pumps said second fluid from a source and said service apparatus directs said first fluid into a waste tank, said measuring step further including the steps of:
    determining a second fluid level in said source;
    determining a first fluid level in said waste tank; and
    comparing said first and said second fluid levels.

41. The method of claim 37, wherein said controlling step controls a speed of said pump.

42. The method of claim 36, wherein said system is a vehicle transmission system and said system pump is a vehicle transmission pump.

43. A method of replacing a first fluid in a system with a second fluid using a service apparatus having a service pump, a plurality of fluid paths, a first hose and a second hose, said system having a system pump, a system inlet and a system outlet, said method comprising the steps of:
    connecting said first hose to said system outlet;
    connecting said second hose to said system inlet;
    starting said system pump to pump said first fluid out of said system outlet;
    circulating said first fluid being pumped out by said system pump back into said system by selecting a recirculating path of said plurality of fluid paths to direct, said first fluid from said system outlet and said first hose to said second hose and said system inlet;
    selecting a replacement path of said plurality of fluid paths to pump out said first fluid from said system through said system outlet and said first hose;
    starting said service pump to pump in a second fluid into said system through said second hose and said system inlet; and
    stopping said service pump.

44. The method of claim 43, wherein said service apparatus further includes a processor, and wherein after said step of starting said service pump, said method further comprising the steps:
    measuring said first fluid and said second fluid by said processor; and
    controlling said service pump by said processor based on said measuring step.

45. The method of claim 44, wherein said processor measures said first fluid and second fluid using level sensors.

46. The method of claim 44, wherein said processor measures said first fluid and second fluid using pressure sensors.

47. The method of claim 44, wherein said service pump pumps said second fluid from a source and said service apparatus directs said first fluid into a waste tank, said measuring step further including the steps of:
    determining a second fluid level in said source;
    determining a first fluid level in said waste tank; and
    comparing said first and said second fluid levels.

48. The method of claim 44, wherein said controlling step controls a speed of said pump.

49. The method of claim 43, wherein said system is a vehicle transmission system and said system pump is a vehicle transmission pump.

50. A method of replacing a first fluid in a system with a second fluid using a service apparatus having a service pump, a plurality of fluid paths, a first hose and a second hose, said system having a system pump, a system inlet and a system outlet, said method comprising the steps of:

connecting said first hose to said system outlet;

connecting said second hose to said system inlet;

starting said system pump to pump said first fluid out of said system outlet;

selecting a replacement path of said plurality of fluid paths to pump out said first fluid from said system through said system outlet and said first hose;

starting said service pump to pump in a second fluid into said system through said second hose and said system inlet;

stopping said service pump; and circulating said second fluid being pumped out by said system pump back into said system by selecting a recirculating path of said plurality of fluid paths to direct said second fluid from said system outlet and said first hose to said second hose and said system inlet.

51. The method of claim 50, wherein said service apparatus further includes a processor, and wherein after said step of starting said service pump, said method further comprising the steps:

measuring said first fluid and said second fluid by said processor; and controlling said service pump by said processor based on said measuring step.

52. The method of claim 51, wherein said processor measures said first fluid and second fluid using level sensor.

53. The method of claim 51, wherein said processor measures said first fluid and second fluid using pressure sensors.

54. The method of claim 51, wherein said service pump pumps said second fluid from a source and said service apparatus directs said first fluid into a waste tank, said measuring step further including the steps of:

determining a second fluid level in said source;

determining a first fluid level in said waste tank; and comparing said first and said second fluid levels.

55. The method of claim 51, wherein said controlling step controls a speed of said pump.

56. The method of claim 50, wherein said system is a vehicle transmission system and said system pump is a vehicle transmission pump.

57. The method of claim 14, wherein said system further includes a filter, and the method further includes a step of replacing said filter prior to said step of reconnecting said pan.

* * * * *